United States Patent
Krøll Jensen et al.

(10) Patent No.: US 11,498,835 B2
(45) Date of Patent: Nov. 15, 2022

(54) LOW STEAM/CARBON REVAMP OF A PLANT COMPRISING A STEAM REFORMING SECTION AND A WATER-GAS SHIFT SECTION

(71) Applicant: HALDOR TOPSØE A/S, Kgs. Lyngby (DK)

(72) Inventors: Annette E. Krøll Jensen, Fredensborg (DK); Christian Henrik Speth, Lynge (DK); Thomas Rostrup-Nielsen, Holte (DK); Niels Christian Schjødt, Brønshøj (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 878 days.

(21) Appl. No.: 16/071,313

(22) PCT Filed: Feb. 28, 2017

(86) PCT No.: PCT/EP2017/054618
§ 371 (c)(1),
(2) Date: Jul. 19, 2018

(87) PCT Pub. No.: WO2017/148929
PCT Pub. Date: Sep. 8, 2017

(65) Prior Publication Data
US 2021/0206634 A1 Jul. 8, 2021

(51) Int. Cl.
*C01B 3/48* (2006.01)
*C01B 3/02* (2006.01)
*C01B 3/40* (2006.01)

(52) U.S. Cl.
CPC .............. *C01B 3/48* (2013.01); *C01B 3/025* (2013.01); *C01B 3/40* (2013.01); *B01J 2219/00024* (2013.01); *C01B 2203/0233* (2013.01); *C01B 2203/0288* (2013.01); *C01B 2203/068* (2013.01); *C01B 2203/1076* (2013.01); *C01B 2203/1241* (2013.01); *C01B 2203/1247* (2013.01); *C01B 2203/1258* (2013.01); *C01B 2203/142* (2013.01)

(58) Field of Classification Search
CPC .. C01B 3/48; C01B 3/025; C01B 3/40; C01B 2203/0233; C01B 2203/0288; C01B 2203/068; C01B 2203/1076; C01B 2203/1241; C01B 2203/1247; C01B 2203/1258; B01J 2219/00024
See application file for complete search history.

(56) References Cited

U.S. PATENT DOCUMENTS

| | | |
|---|---|---|
| 2010/0000155 A1 | 1/2010 | Schiodt |
| 2010/0112397 A1 | 5/2010 | Takatsu et al. |
| 2011/0101279 A1 | 5/2011 | Schiødt |
| 2013/0101490 A1 | 4/2013 | Filippi et al. |
| 2016/0311680 A1 | 10/2016 | Filippi et al. |

FOREIGN PATENT DOCUMENTS

| | | |
|---|---|---|
| CN | 101618318 A | 1/2010 |
| CN | 102083745 A | 6/2011 |
| CN | 102971251 A | 3/2013 |
| EP | 2 135 673 A1 | 12/2009 |
| EP | 2 141 118 A1 | 1/2010 |
| EP | 2 404 869 A1 | 1/2012 |
| EP | 2404869 A1 | 1/2012 |
| EP | 2 886 513 A1 | 6/2015 |
| WO | 2010/000387 A1 | 1/2010 |
| WO | 2010000387 A1 | 1/2010 |

OTHER PUBLICATIONS

Office Action (Text of the First Office Action) dated May 14, 2021, by the China National Intellectual Property Administration in corresponding Chinese Patent Application No. 201780013775.4, and an English Translation of the Office Action. (13 pages).
International Search Report (PCT/ISA/210) dated May 26, 2017, by the European Patent Office as the International Searching Authority for International Application No. PCT/EP2017/054218.
Written Opinion (PCT/ISA/237) dated May 26, 2017, by the European Patent Office as the International Searching Authority for International Application No. PCT/EP2017/054218.
Danish Search Report for PA 2016 00127 dated Oct. 14, 2016.
Office Action (Examination Report and Search Report) dated Oct. 5, 2020 by the Taiwanese Patent Office in corresponding Taiwanese Patent Application No. 106106644, and an English Translation of the Office Action. (23 pages).

*Primary Examiner* — Jafar F Parsa
(74) *Attorney, Agent, or Firm* — Buchanan Ingersoll & Rooney P.C.

(57) ABSTRACT

The present invention relates to a revamp method for increasing the front-end capacity of a plant comprising
  a reforming section, wherein a feed is reformed in at least one reforming step to a reformed stream comprising $CH_4$, CO, $CO_2$, $H_2$ and $H_2O$
  a shift section wherein the reformed stream is shifted in a shift reaction in at least a high temperature shift step, said method comprising the steps of
  In the High temperature shift step exchanging an original Fe-based catalyst with a non-Fe-based catalyst
  Increasing the feed flow to the reforming section, and
  The HTS step is carried out at a reduced steam/dry-gas ratio (S/DG) compared to an original S/DG in the original HTS step with the original Fe-based catalyst.

16 Claims, No Drawings

LOW STEAM/CARBON REVAMP OF A PLANT COMPRISING A STEAM REFORMING SECTION AND A WATER-GAS SHIFT SECTION

Following today's demand and competitiveness in e.g. ammonia production, significant efforts have been put into developing optimized production for ammonia plants, with the objective to improve overall energy efficiency and reduce capital cost. The need for more cost-efficient production solutions has spurred the development of technology and catalysts for large-scale ammonia production units, in order to benefit from economy of scale. Production plants such as $H_2$ and ammonia plants have a long lifetime which means that the development within the field has led to new and better solutions for new plants before an old plant is "run out". However by revamping existing plants it is possible to optimize older plants to achieve positive effects on field, economy and environmental parameters.

Targeted revamps of existing plants is thus an important but not trivial option as solutions viable in new plants may not necessarily be the best option in relation to revamps of existing plants as well as solutions which may not be the best option in a new plant still may provide a significant improvement during a revamp.

According to the present invention is provided a method for increasing the front-end capacity of a plant comprising
 a reforming section, wherein a feed is reformed in at least one reforming step to a reformed stream comprising $CH_4$, CO, $CO_2$, $H_2$ and $H_2O$
 a shift section wherein the reformed stream is shifted in at least a high temperature shift (HTS) step (CO+$H_2O \leftrightarrow CO_2+H_2$+heat),
said method comprising the steps of
 In the HTS step exchanging an original Fe-based catalyst with a non-Fe-based catalyst
 Increasing the feed flow to the reforming section, and
 The HTS step is carried out at a reduced steam/dry-gas (S/DG) ratio compared to an original S/DG in the original HTS step with the original Fe-based catalyst.

I.e. by the present method it is possible to increase the capacity of an existing front-end, and thereby of an existing production plant and process by a highly efficient revamp solution.

By reducing the relative steam amount in the feed, it is possible that the mass flow through the plant is reduced allowing a larger natural gas throughput and thus increased capacity of the plant.

Even when the firing profile in the reformer section e.g. in the primary reformer is kept constant it is possible to increase production capacity up to e.g. 3-5% by the present method for revamping a plant when used in an existing ammonia plant.

The present method may be especially beneficial when applied on an existing $H_2$ plant, $NH_3$ plant or in a plant producing synthesis gas for $H_2$ or $NH_3$ production.

Depending on the type of plant, location, feeds available on site etc., the feed may be natural gas (e.g. comprising mainly $CH_4$ including possibly small amounts of higher hydrocarbons, nitrogen, $CO_2$ and other traces), naphtha, rich gases, LPG etc. or combinations hereof.

In known standard plants of the type mentioned above the standard original catalyst is a Fe-based catalyst comprising oxides of Fe, Cr (0-20% wt/wt) and/or Cu (0-10% wt/wt).

The above mentioned Fe-based catalysts are typically containing iron oxide as the main component; i.e. the iron oxide content on a weight basis exceeds 50%. This is valid both for the catalyst in its oxidized and reduced (activated) form.

The non-Fe-based catalysts may either be completely free of iron (other than trace levels) or may contain limited amounts of Fe (up to 10% iron oxide on a weight basis).

Fe-based catalysts suffer from an inherent weakness, namely their propensity to form iron carbides or even elemental iron under conditions of low S/DG ratios. This is exemplified by the following reaction:

$$5Fe_3O_4+32CO \leftrightarrow 3Fe_5C_2+26CO_2 \quad (1)$$

Formation of iron carbide and/or elemental iron will weaken the catalyst pellets and may result in catalyst disintegration and pressure drop increase.

Furthermore, iron carbide will catalyze Fischer-Tropsch by-product formation

$$nCO+(n+m/2)H_2 \leftrightarrow C_nH_m+nH_2O \quad (2)$$

The Fischer-Tropsch reactions consume hydrogen, whereby the efficiency of the shift section is reduced.

Thus, the standard use of iron based HT shift catalyst requires a steam/carbon (S/C) ratio of around 2.6 or above to avoid iron carbide formation.

The applicant has shown that using a non-Fe-based catalyst such as a promoted zinc-aluminum oxide based catalyst, for example the Topsøse SK-501 Flex™ HT shift catalyst, which enables operation of the reforming section and HT shift section at a S/C ratio down to 0.3 is a highly advantageous substitute for the standard original Fe based catalyst. The new non-Fe-based HTS catalyst is not limited by S/C and/or S/DG requirements which results in high operational flexibility and a benefit of capacity revamping with a non-Fe-based catalyst e.g. promoted zinc-aluminum oxide based catalyst such as SK-501 Flex™ is seen which was not possible with the previous conventional HTS catalysts.

In advantageous embodiments of the method the non-Fe-based catalyst is a zinc-aluminum oxide based catalyst which in its active form comprises a mixture of zinc aluminum spinel and zinc oxide in combination with an alkali metal selected from the group consisting of Na, K, Rb, Cs and mixtures thereof, and optionally in combination with Cu. The catalyst may have a Zn/Al molar ratio in the range 0.5 to 1.0, a content of alkali metal in the range 0.4 to 8.0 wt % and a copper content in the range 0-10% based on the weight of oxidized catalyst.

The shift section may comprise one or more HT shift steps together with one or more medium temperature (MT) shift steps and/or one or more low temperature (LT) shift steps.

The temperature in the HT shift step may e.g. be in the range 300-600° C., such as 360-470° C. For example, the high temperature shift inlet temperature may be 300-400° C., such as 350-380° C.

This lowered requirement to the S/C and/or S/DG ratio enables an increased feed flow into the reforming section resulting in increased production rates.

In preferred embodiments the HTS step may be carried out at a reduced S/DG ratio of 0.1-0.9 such as 0.2-0.5 or 0.25-0.45 or 0.3-0.44.

The requirement of a minimum S/DG ratio in the HTS reactor represents a significant impediment for many producers wanting to remain competitive in the current market.

Removing or minimizing the S/DG limitation according to the present invention allows producers to achieve better profitability through increased production capacity, which is essential in today's economy of rising costs and rapid market fluctuations.

The S/DG ratio is defined as the ratio of steam and the dry process gas on molar basis inlet the HTS reactor.

The S/C ratio is defined as the ratio of all steam added to the reforming section up-stream the HT shift section and the hydrocarbons in the feedgas to the reforming section on molar basis.

In various embodiments the S/DG ratio is reduced with 5-25%, such as 10-20%, e.g. with 12-17% with respect to the original S/DG ratio.

Original S/DG, original HTS step, original Fe-based catalyst, original steam addition refers to the S/DG, HTS step, catalyst, steam addition prior to revamp. I.e. Original is used for terms pre-revamp.

Preferably the feed flow is increased with at least 2% preferably as at least 5%. For example the feed flow is increased 2-25%, such as 4-20%.

When the feed flow is increased and the steam addition is kept constant or only raised less than the feed flow the S/DG ratio is lowered compared to the original process.

However, it is possible that the steam addition up-stream the HTS step is reduced compared to the original steam addition by 0.1-50%, such as 0.5%-15%, such as 1-10%.

By reducing the steam amount in the feed the mass-flow through the plant is reduced allowing a larger natural gas throughput and thus increased capacity of the plant. The firing profile in the primary reformer may be kept constant to maintain design conditions for the primary reformer and/or other parts of the reforming section.

The pressure drop dP is generally increased compared to the original dP when the capacity of the plant is increased. The increased pressure drop dP which may be induced by the present method (due to increased plant load when increasing the capacity up to e.g. 3-5%) can be at least partly compensated if desired by using low pressure drop catalyst (e.g. in the reforming section and in additional shift step(-s)). Further pressure drop reduction is possible by replacing most of the aluminum support balls with a catalyst support grid in the bottom of the HTS reactor. The support grid consists of a modified outlet collector, outlet brackets, outlet connector rods, skirt section and a mesh grid section, all of which float in the bottom of the vessel.

The reforming section may comprise a primary reformer possibly in combination with a pre-reformer and/or additional reformer types in parallel and/or series.

The shift section may further comprise one or more Medium and/or Low temperature shift steps.

The reforming section is optionally revamped to include one or more reformer types, adiabatic, gas/flue gas convective, gas/gas convective, radiant, autothermal. Furthermore, the present revamp of an existing process and plant may be combined with one or more additional revamps up- and/or downstream the reforming section.

EXAMPLE

It is seen in table 1 that by gradual reduction of S/C by 0.1 (from 2.8 to 2.5) a possible capacity increase of 1.5% can be obtained for each reduction step (4.5% for S/C=2.5). NG load increases up to 6.6% and steam load reduces down to 4.8% in the below example.

TABLE 1

Capacity increase in existing ammonia plants using SK-501 Flex ™

| Case | S/C | Capacity | Increased NG load (%) | Increased steam load (%) | S/DG inlet HTS reactor |
|---|---|---|---|---|---|
| Base | 2.8 | 100 | — | — | 0.48 |
| C10 | 2.7 | 101.5 | 2.1 | −1.5 | 0.46 |
| C11 | 2.6 | 103.0 | 4.3 | −3.2 | 0.44 |
| C12 | 2.5 | 104.5 | 6.6 | −4.8 | 0.42 |

Thus, the applicant has found that by the present invention a gradual reduction of S/C by 0.1 (from 2.8 to 2.5) results in a possible capacity increase of 1.5% for each reduction step (4.5% for S/C=2.5).

A higher pressure drop through the front-end can be compensated in several ways. The compressors are normally designed with 1 kg/cm$^2$ margin which allows some compensation simply using the pre revamp-compressor capacity. Furthermore, by changing to a low pressure drop catalyst for example in combination with substituting support balls in the HTS with a catalyst support grid additional pressure drop can be saved Calculations with SK-501 Flex™, a non-Fe-based catalyst as described, in existing ammonia plants show that the capacity can be increased by reducing S/C ratio if the primary reformer firing profile is kept constant and the obtained pressure drop is utilized for increasing the plant capacity.

When increasing the natural gas throughput for increasing the plant capacity the pressure drop through the plant increases. The increased pressure drop can be compensated by installing low pressure drop catalysts in the front end and a special support grid in the HTS reactor.

A non-Fe-based catalyst as described herein such as the special composition of SK-501 Flex™ offers new benefits to ammonia and syngas producers. With the possibility to operate the plant at S/C and corresponding S/DG ratios previously unattainable with commercial Fe-based catalysts, producers can achieve unprecedented improvements in capacity increase. For example, a decrease in S/C from 2.8 to 2.5 (enabled by the present change of catalyst to a non-Fe based cat) can result in up to 3-5% more ammonia production. For an ammonia plant capacity of 2,200 MTPD, the extra production translates into approximately 11 MM USD per year in extra revenue, assuming a price of 350 USD/MT.

The invention claimed is:

1. A method for increasing the front-end capacity of a plant comprising
    a reforming section, wherein a feed is reformed in at least one reforming step to a reformed stream comprising $CH_4$, $CO$, $CO_2$, $H_2$ and $H_2O$,
    a shift section wherein the reformed stream is shifted in a shift reaction in at least a high temperature shift step, said method comprising the steps of
        in the High temperature shift step exchanging an original Fe-based catalyst with a non-Fe-based catalyst
        increasing the feed flow to the reforming section, and the HTS step is carried out at a reduced steam/dry-gas ratio (S/DG) compared to an original S/DG in the original HTS step with the original Fe-based catalyst.

2. The method according to claim 1 wherein the feed comprises natural gas, naphtha, rich gases, LPG, or combinations thereof.

3. The method according to claim 1 wherein the plant is a $H_2$ or $NH_3$ or synthesis gas for $H_2$ or $NH_3$ production plant.

4. The method according to claim 1 wherein the original Fe-based catalyst comprises oxides of iron, chromium and optionally copper.

5. The method according to claim 1 wherein the non-Fe-based catalyst comprises oxides or other compounds of Zn, Al, and alkali metal selected from the group of Na, K, Rb and Cs and optionally Cu.

6. The method according to claim 1 wherein the HTS step is carried out at a reduced S/DG ratio of below 0.9.

7. The method according to claim 1 wherein the feed flow is increased with at least 2%.

8. The method according to claim 1 wherein the S/DG ratio is reduced 1-50% with respect to the original S/DG ratio.

9. The method according to claim 1 wherein the steam addition upstream the HTS step is reduced compared to the original steam addition by 0.1-50.

10. The method according to claim 1 wherein the pressure drop dP is increased compared to the original dP.

11. The method according to claim 1 wherein the reforming section may comprise a performing step.

12. The method according to claim 1 wherein the shift section further comprises one or more medium and/or low temperature shift steps.

13. The method according to claim 1 wherein the reforming section is further revamped.

14. The method according to claim 8, wherein the S/DG ratio is reduced 5-25% with respect to the original S/DG ratio.

15. The method according to claim 8, wherein the S/DG ratio is reduced 10-20% with respect to the original S/DG ratio.

16. The method according to claim 8, wherein the S/DG ratio is reduced 12-17% with respect to the original S/DG ratio.

* * * * *